(12) United States Patent
Poccia et al.

(10) Patent No.: US 7,793,507 B2
(45) Date of Patent: Sep. 14, 2010

(54) EXPANSION JOINT FOR GAS TURBINES

(75) Inventors: Nicholas Philip Poccia, Gansevoort, NY (US); Carlos Serafim Albuquerque Fernandes, Greenville, SC (US); Matthew John Canham, Greenville, SC (US); Ian James Morton, Simpsonville, SC (US); Thomas M. Albert, Greer, SC (US)

(73) Assignee: General Electric Company, Schenectady, NY (US)

( * ) Notice: Subject to any disclaimer, the term of this patent is extended or adjusted under 35 U.S.C. 154(b) by 1000 days.

(21) Appl. No.: 11/470,713

(22) Filed: Sep. 7, 2006

(65) Prior Publication Data

US 2008/0060362 A1     Mar. 13, 2008

(51) Int. Cl.
     *F02C 7/20*      (2006.01)
(52) U.S. Cl. .......................... 60/799; 403/28; 285/905; 277/411
(58) Field of Classification Search .................... 60/799, 60/800; 403/28–30; 285/187, 905, 381.1, 285/382.2; 277/411, 637, 650, 930–932
See application file for complete search history.

(56) References Cited

U.S. PATENT DOCUMENTS

| 4,318,668 | A | * | 3/1982 | Chaplin et al. ............... 415/135 |
|---|---|---|---|---|
| 5,088,775 | A | * | 2/1992 | Corsmeier et al. ........... 285/374 |
| 5,221,096 | A | * | 6/1993 | Heldreth et al. .............. 277/630 |
| 5,400,586 | A | * | 3/1995 | Bagepalli et al. .............. 60/800 |
| 5,443,290 | A | * | 8/1995 | Boyer et al. ................... 285/95 |
| 6,065,756 | A | | 5/2000 | Eignor et al. |
| 6,076,835 | A | * | 6/2000 | Ress et al. .................... 277/637 |
| 6,464,457 | B1 | * | 10/2002 | Morgan et al. ............ 415/174.2 |
| 6,895,757 | B2 | * | 5/2005 | Mitchell et al. ................ 60/772 |
| 7,040,098 | B2 | * | 5/2006 | Lepretre et al. ................ 60/799 |
| 7,527,469 | B2 | * | 5/2009 | Zborovsky et al. ............. 415/9 |
| 7,594,792 | B2 | * | 9/2009 | Audeon et al. .............. 415/135 |
| 2002/0163134 | A1 | * | 11/2002 | Cromer ....................... 277/411 |
| 2004/0041355 | A1 | * | 3/2004 | Suzuki et al. ................ 277/650 |
| 2006/0123797 | A1 | * | 6/2006 | Zborovsky et al. ............ 60/800 |
| 2007/0025841 | A1 | * | 2/2007 | Milazar ....................... 415/134 |
| 2008/0053107 | A1 | * | 3/2008 | Weaver et al. ................. 60/800 |
| 2008/0166233 | A1 | * | 7/2008 | Johnson et al. ............. 415/230 |
| 2009/0085301 | A1 | * | 4/2009 | Suzuki et al. ................ 277/399 |

* cited by examiner

*Primary Examiner*—William H Rodriquez
(74) *Attorney, Agent, or Firm*—Sutherland Asbill & Brennan LLP

(57) ABSTRACT

An expansion joint for use between a turbine duct and an exhaust duct. The expansion joint may include a flange attached to the turbine duct and a number of plates attached to the exhaust duct that extend towards the flange. The plates and the flange may include a gap therebetween, the gap being narrower when the turbine duct is hot than when the turbine duct is cold.

9 Claims, 3 Drawing Sheets

EXPANSION JOINT FOR GAS TURBINES

TECHNICAL FIELD

The present application relates generally to gas turbines and more particularly relates to an expansion joint for use between a turbine duct and a diffuser duct or elsewhere.

BACKGROUND OF THE INVENTION

Gas turbines may have an expansion joint positioned between a turbine duct flange and a diffuser duct. The diffuser duct provides performance benefits to the turbine as a whole by expanding the exhaust gases to achieve optimum aerodynamic pressure recovery. Most turbine ducts run hot and are machined structures while most diffuser ducts are lower cost fabricated casings that are internally insulated and relatively cold. Because of the thermal mismatch at this connection, an expansion joint is generally used to accommodate the large relative displacements between these components.

Known expansion joints can take many forms. When relatively large axial, vertical, and lateral movements are expected, the expansion joint may be designed with a vertically mounted flexible element. This type of design requires a vertical offset between the turbine duct aft flange and the diffuser duct forward flange. The offset provides a location to attach each end of the flexible vertical element and also provides a collection trough for water wash fluid and/or liquid fuel that may enter the diffuser after a false start.

The open trough, however, presents a discontinuity in the flow path and may result in a pressure loss that negatively impacts the overall turbine performance and heat rate. Further, liquid fuel that does not fully drain from the combustion system will flow into the exhaust diffuser duct. If not properly drained, the liquid fuel may soak the insulation and become a fire hazard when the gas turbine does start. Likewise, water from turbine water wash may enter the expansion joint insulation and flow out onto the ground. To address the drainage issue, a flow shield has been bolted to the turbine flange so as to protect the flexible element. The flow shield, however, must face high transient thermal stresses and does not provide total protection from pressure pulsations. As a result, the flow shield generally must be fabricated with high cost materials.

There is a desire, therefore, for an improved turbine expansion joint that will allow drainage of liquids entering the exhaust diffuser duct while limiting damage to the internal insulation. The expansion joint preferably provides a smooth aerodynamic transition between the ducts. Moreover, the expansion joint preferably may be made with low cost manufacturing methods and materials that are easy to install and maintain.

SUMMARY OF THE INVENTION

The present application thus provides an expansion joint for use between a turbine duct and an exhaust duct. The expansion joint may include a flange attached to the turbine duct and a number of plates attached to the exhaust duct that extend towards the flange. The plates and the flange may include a gap therebetween, the gap being narrower when the turbine duct is hot than when the turbine duct is cold.

The expansion joint further may include a flexible element positioned between the turbine duct and the exhaust duct. The flexible element may be a nickel-based alloy. The flexible element may be attached to the flange.

The plates may include an austenitic steel stabilized by Titanium or Niobium. The plates may include a number of apertures therein. The plates are attached to the exhaust duct via bolts positioned within the apertures. The apertures are larger than the bolts.

The gap may be about three (3) to about seven (7) inches (about 76.2 to about 177.8 millimeters) in width when the turbine duct is cold and about one half (0.5) to about one (1) inch (about 12.7 to about 25.4 millimeters) when the turbine duct is hot. The turbine duct expands towards the plates.

The present application further describes a method of allowing fluids to drain from an exhaust duct when a turbine duct is cold while providing a smooth aerodynamic transition when the turbine duct is hot. The method may include positioning a number of plates on the exhaust duct so as to define a gap between the turbine duct and the plates, heating the turbine duct, and expanding the turbine duct towards the plates so as to narrow the gap. Expanding the turbine duct may include narrowing the gap from about 4.5 inches (about 114.3 millimeters) to about 0.75 inches (about 19.05 millimeters).

The present application further may provide an expansion joint for use between a first duct and a second duct. The expansion joint may include a number of plates attached to the second duct and extending towards the first duct. The plates and the first duct may include a gap therebetween, the gap being narrower when the first duct is hot than when the first duct is cold.

The plates may include an austenitic steel stabilized by Titanium or Niobium. The gap may be about three (3) to about seven (7) inches (about 76.2 to about 177.8 millimeters) in width when the turbine duct is cold and about one half (0.5) to about one (1) inch (about 12.7 to about 25.4 millimeters) when the first duct is hot. The first duct expands towards the plates. The first duct may include a flange and the plates extend towards the flange.

The expansion joint further may include a flexible element positioned between the first duct and the second duct. The flexible element may include a nickel based alloy.

The plates may include a number of apertures therein. The plates are attached to the second duct via bolts positioned within the apertures and the apertures are larger than the number of bolts.

These and other features of the present application will become apparent to one of ordinary skill in the art upon review of the following detailed description when taken in conjunction with the several drawings and the appended claims.

DETAILED DESCRIPTION

Figure 1:
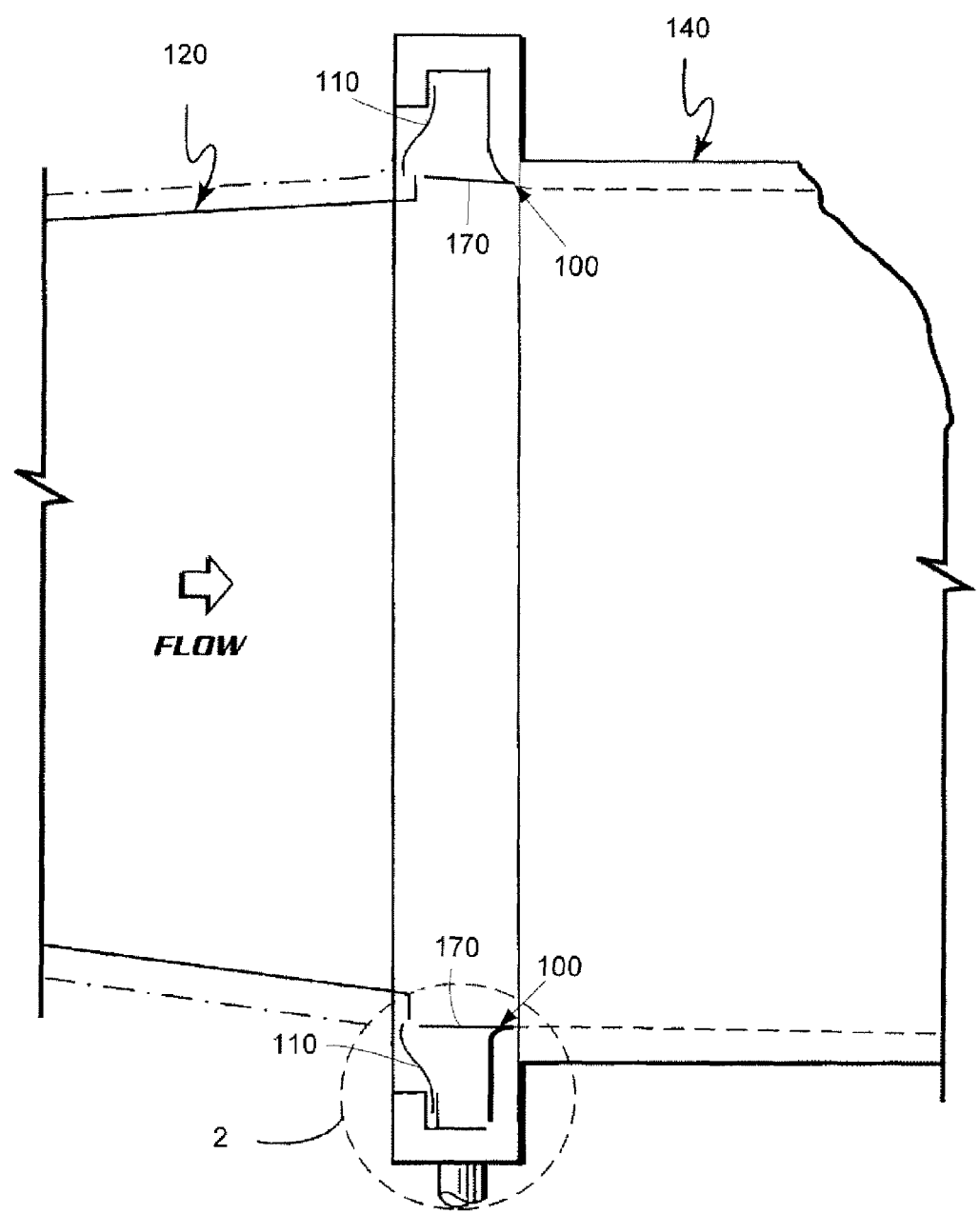
FIG. 1 is a partial side view illustrating an expansion joint positioned between a gas turbine exhaust duct and an adjacent diffuser duct as is described herein.
Figure 2:
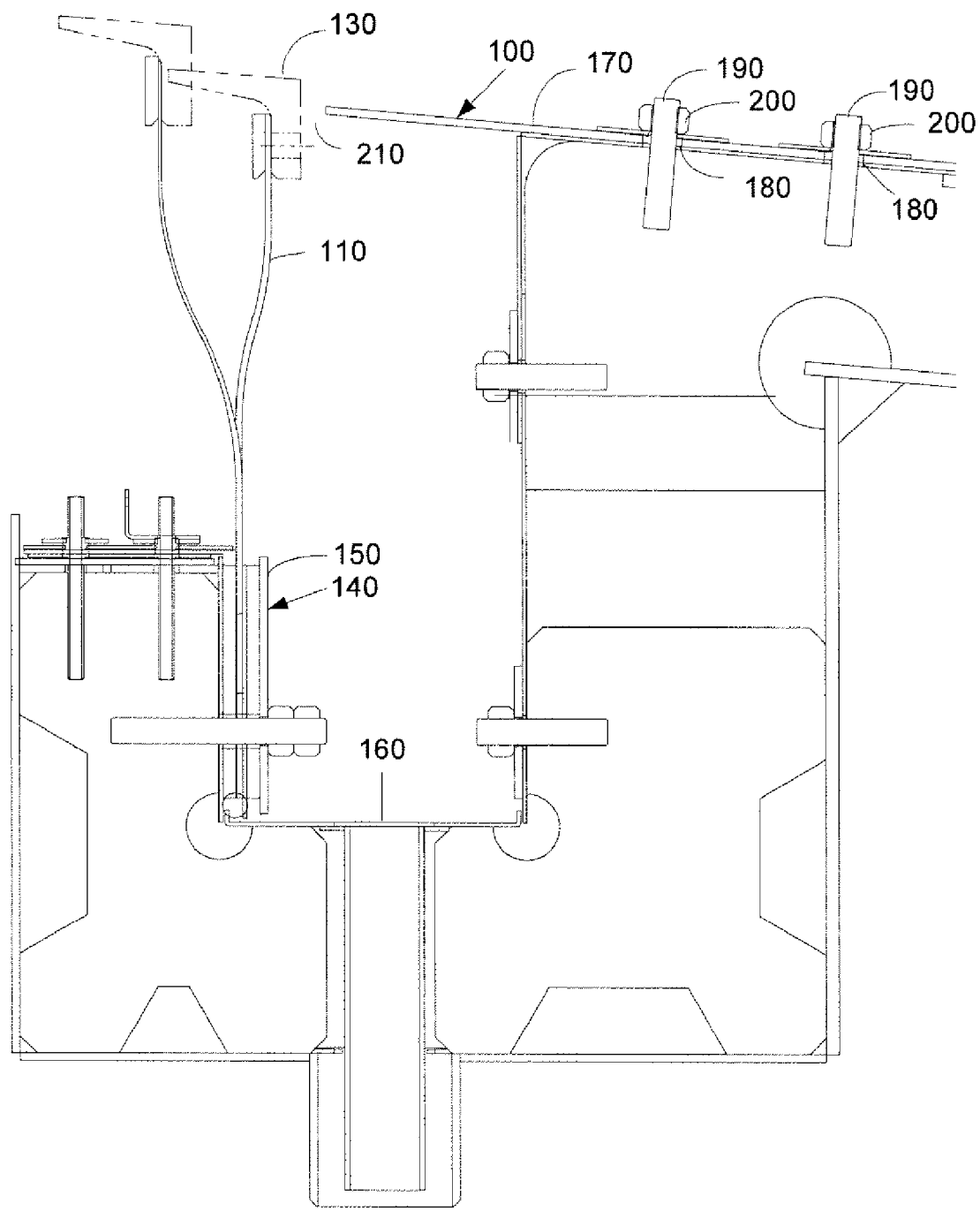
FIG. 2 is a side plan view of the expansion duct of FIG. 1.
Figure 3:
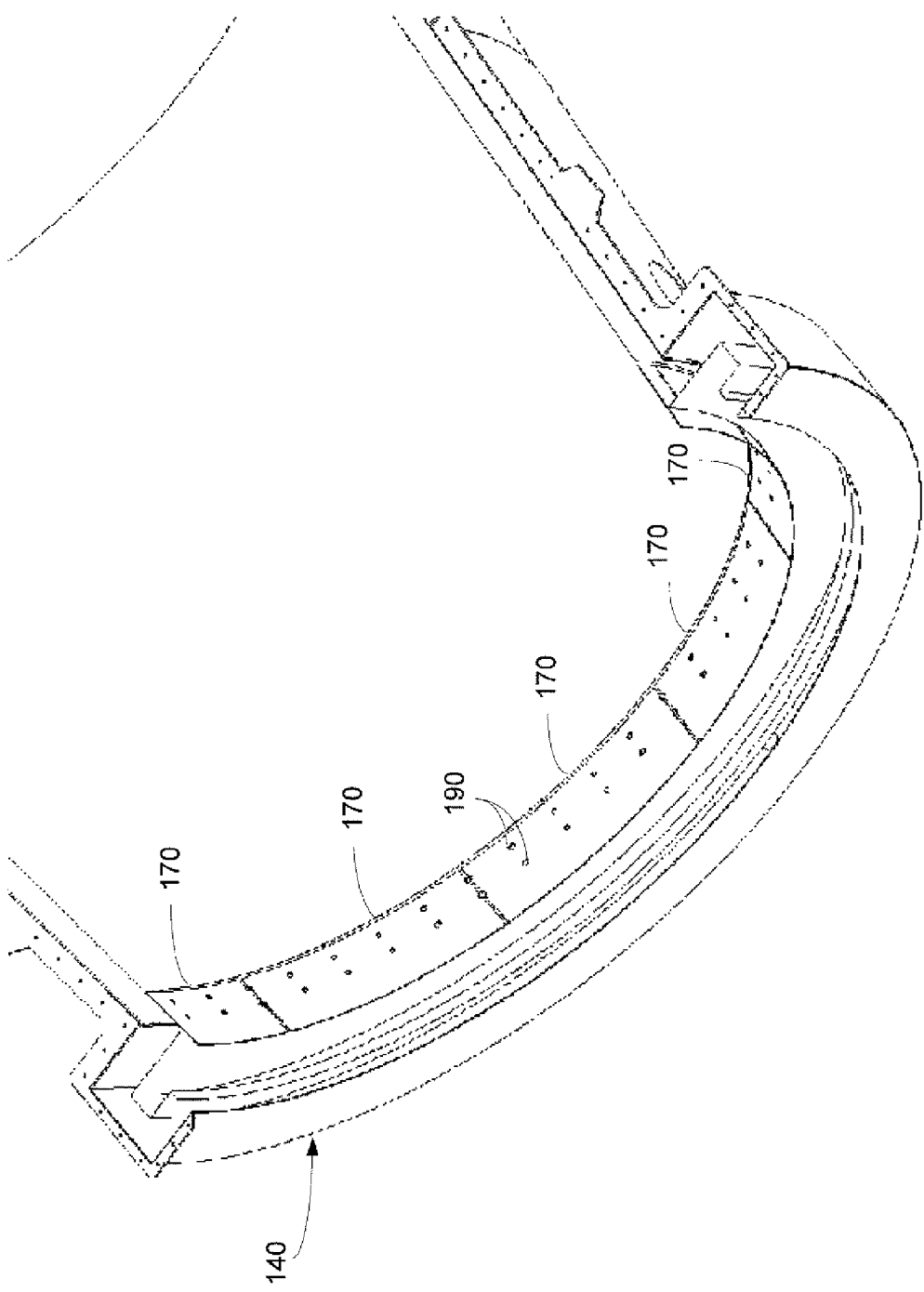
FIG. 3 is a front perspective view of the plates of the expansion joint of FIG. 1.

Referring now to the drawings, in which like numbers refer to like elements throughout the several views, FIGS. 1-3 show an expansion joint 100 as is described herein. The expansion joint 100 may include a flexible element 110. The flexible element 110 may in fact be a number of relatively thin flexible plates joined together. Specifically, the flexible element 110 may have a number of Inconel plates of varying thickness. (Inconel is a nickel based super alloy that has high oxidation and corrosion resistance. Inconel alloys are sold by Special Metals Corporation of New Hartford, N.Y.) Other types of flexible materials or similar materials may be used herein.

As is shown, the flexible element 110 may be attached on one end to a turbine duct 120. The turbine duct 120 may be of conventional design. The flexible element 110 may be attached to the turbine duct 120 at a radial flange 130 or a similar location. The flexible element 110 may be attached to the radial flange 130 by a number of fasteners. The flexible element 110 also may be attached to a diffuser duct 140 at the other end. The diffuser duct 140 may be of conventional design. Other types of exhaust ducts may be used herein. The flexible element 110 may be positioned within a pair of flanges 150 on the diffuser duct 140 or at a similar location. A drainage trough 160 or similar type of structure may be positioned about the pair of flanges 150 of the diffuser duct 140.

The expansion joint 100 further may include a number of segmented plates 170. The plates 170 may be made out of an austenitic steel stabilized by Titanium or Niobium. Examples include 321 and 347 grade stainless steel or similar types of materials. The plates 170 may be manufactured and installed using readily available manufacturing methods and parts. The segmented plates 170 may be bolted on the downstream side of the expansion joint 100. Specifically, the plates 170 may be bolted to the diffuser duct 160. The plates 170 may include a number of oversized apertures 180. The plates 170 may be bolted to the diffusion duct 140 via a number of bolts 190 and with oversized washers 200. Other types of attachment means may be used herein. The plates 170 extend outwardly from the diffusion duct 140 towards the radial flange 130 of the turbine duct 120.

In use, the apertures 180 within the plates 170 allow the plates 170 to grow thermally in the circumferential and axial directions yet remain firmly secured to the diffuser duct 140 via the number of bolts 190. Because the diffuser duct 140 generally is internally insulated, the plates 170 are mounted to a well-damped surface and should not be subject to excessive vibrations due to flow excitation or from similar causes.

When the expansion joint 100 is cold and the turbine is not operating, a gap 210 exists in the flow path between the plates 170 and the radial flange 130. The gap 210 allows for drainage of liquid fuel if a false start should occur. Likewise, water from a turbine wash may drain out. When the gas turbine runs and becomes hot however, the turbine duct 120 will experience thermal growth. As a result, the radial flange of the turbine duct 120 will move aft towards the diffusion duct 140. The gap 210 between the radial flange 130 and the plates 170 thus narrows so as to provide a smooth aerodynamic transition. As the gap 210 closes, the flexible element 110 also is protected from pressure fluctuations.

The gap 210 may be about three (3) to about seven (7) inches (about 76.2 to about 177.8 millimeters) in width when the turbine duct 120 is cold and may be about one-half (0.5) to about one (1) inch (about 12.7 to about 25.4 millimeters) when the turbine duct 120 is hot. Other dimensions may be used herein. FIG. 2 shows the radial flange 130 in the hot position to the right and the cold position to the left.

The expansion joint 100 describes herein thus provides a smooth aerodynamic transition. This smooth aerodynamic transition maximizes system pressure recovery while providing protection from pressure pulsations. The plates 170 can accommodate relatively large displacements between the flange 130 of the turbine duct 120 and the diffusion duct 140. The expansion joint 100 as a whole thus can address the large relative axial, vertical, and lateral displacements due to thermal growth between the gas turbine 120 and the diffuser duct 140. The plates 170 also are not susceptible to flow excitation.

Further, the gap 210 provides a reliable way to drain all liquids that may enter the diffuser duct 140.

It should be apparent that the foregoing relates only to the preferred embodiments of the present application and that numerous changes and modifications may be made herein by one of ordinary skill in the art without departing from the generally spirit and scope of the invention as defined by the following claims and equivalents thereof.

We claim:

1. An expansion joint for use between a turbine duct and an exhaust duct, comprising:
   a flange attached to the turbine duct;
   a flexible element positioned between and attached to the flange of the turbine duct and the exhaust duct; and
   a plurality of plates attached to the exhaust duct and extending towards the flange;
   the plurality of plates and the flange comprising a gap therebetween, the gap being narrower when the turbine duct is hot than when the turbine duct is cold.

2. The expansion joint of claim 1, wherein the flexible element comprises a nickel based alloy.

3. The expansion joint of claim 1, wherein the plurality of plates comprises an austenitic steel stabilized by Titanium or Niobium.

4. The expansion joint of claim 1, wherein the plurality of plates comprises a plurality of apertures therein.

5. The expansion joint of claim 1, wherein the gap comprises about three (3) to about seven (7) inches (about 76.2 to about 177.8 millimeters) in width when the turbine duct is cold and about one half (0.5) to about one (1) inch (about 12.7 to about 25.4 millimeters) when the turbine duct is hot.

6. The expansion joint of claim 1, wherein the turbine duct expands towards the plurality of plates.

7. An expansion joint for use between a turbine duct and an exhaust duct, comprising:
   a flange attached to the turbine duct; and
   a plurality of plates attached to the exhaust duct and extending towards the flange;
   the plurality of plates and the flange comprising a gap therebetween, the gap being narrower when the turbine duct is hot than when the turbine duct is cold;
   wherein the plurality of plates comprises a plurality of apertures therein; and
   wherein the plurality of plates is attached to the exhaust duct via bolts positioned within the plurality of apertures and wherein the plurality of apertures each comprises an oversized diameter larger than the plurality of bolts so as to accommodate thermal growth of the plurality of plates.

8. A method of allowing fluids to drain from an exhaust duct when a turbine duct is cold while providing a smooth aerodynamic transition when the turbine duct is hot, comprising:
   positioning a plurality of plates on the exhaust duct so as to define a gap between the turbine duct and the plurality of plates;
   attaching a flexible element to the turbine duct about the gap and to the exhaust duct;
   heating the turbine duct; and
   expanding the turbine duct towards the plurality of plates so as to narrow the gap.

9. The method of claim 8, wherein expanding the turbine duct comprises narrowing the gap from about 4.5 inches (about 114.3 millimeters) to about 0.75 inches (about 19.05 millimeters).

* * * * *